July 3, 1956 J. KRUKOWSKI 2,752,819
EYE GLASS FRAME WITH MOVABLE OPTICAL ELEMENT
Filed July 6, 1953
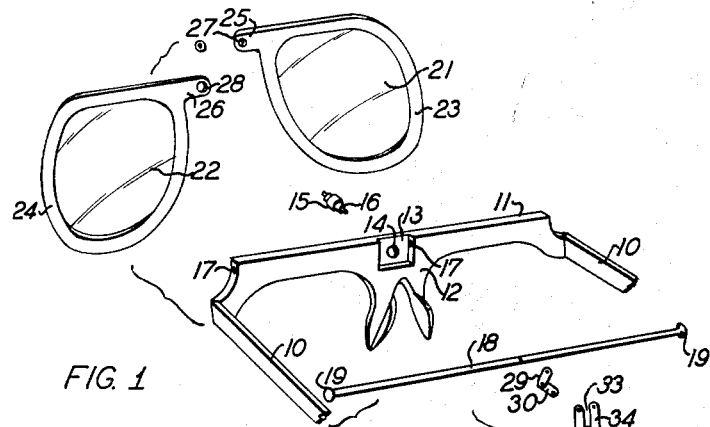
FIG. 1
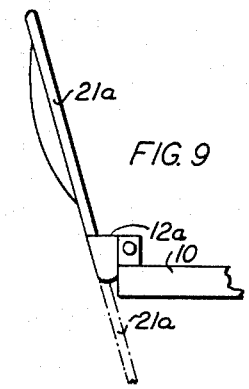
FIG. 9
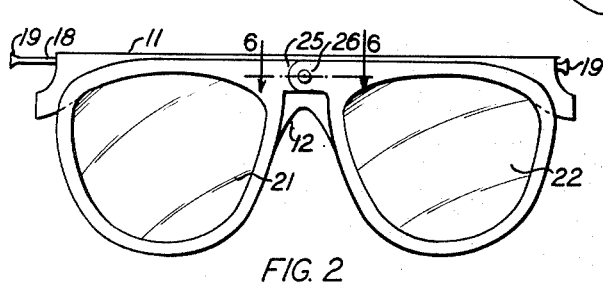
FIG. 2
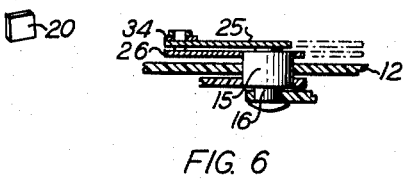
FIG. 6
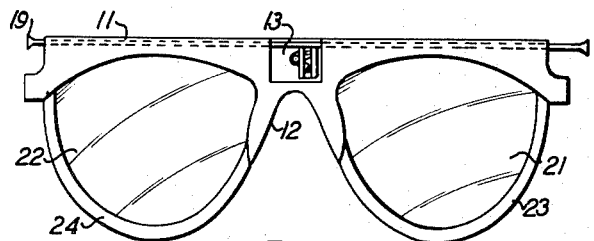
FIG. 3
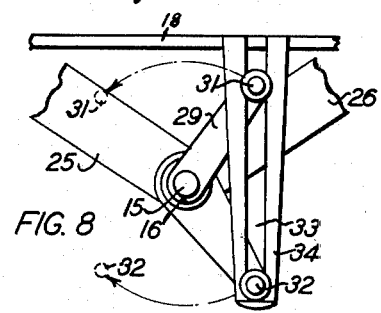
FIG. 7
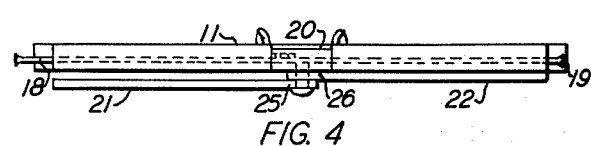
FIG. 4
FIG. 8
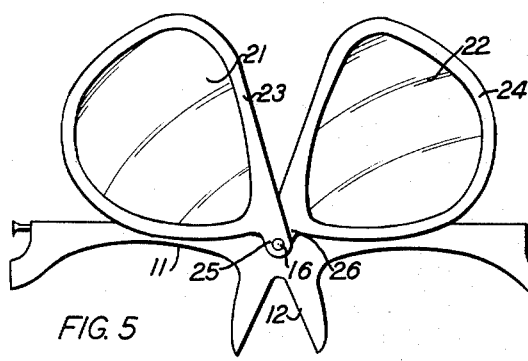
FIG. 5
INVENTOR
JOSEPH KRUKOWSKI
BY
AGENT

United States Patent Office 2,752,819
Patented July 3, 1956

2,752,819
EYE GLASS FRAME WITH MOVABLE OPTICAL ELEMENT

Joseph Krukowski, South River, N. J.

Application July 6, 1953, Serial No. 366,285

8 Claims. (Cl. 88—41)

This invention relates to eye glass frames with movable optical elements which are displaceable from the line of vision with respect to the frames upwardly to positions above the frames so as to change the optical effect on the eye or eyes of the wearer. The invention is susceptible of having the movable optical elements either in frames with or without stationary lenses, in the form of reading lenses alone, or in conjunction with other lenses for use for near or distant focusing. Further while the movable optical elements are particularly adapted for normal reading eye glasses the invention is also susceptible for use in connection with colored or sun glasses as eye shades and either singly or in pairs as hereinafter shown for the purpose of setting forth a preferred arrangement of the invention, for use in connection with optical magnifying lenses and the like.

While in the past movable optical elements have been proposed the disclosures of such devices are all subject to numerous objections. Therefore, the primary object of this invention is to provide an improved arrangement for such movable optical devices which will be practical to manufacture and in use and overcome the defects of such earlier forms of such devices.

An important object of the invention is to provide simple operating means including a longitudinal element extending through the upper cross portion or frontal member of the eye glass frame which is operable at a side of the frame, out of the line of vision to the front thereof, for operating the optical element or elements to swing the optical element or elements from their normal position upwardly out of the line of vision by a longitudinal movement of the longitudinal element in one direction and to return it to normal position by a movement of the longitudinal element in the reverse direction.

Still another object of the invention is to provide such longitudinal element with a finger engaging piece at each end, one at one side of the eye glass frame to be pressed to move the longitudinal member to swing the optical elements to their upper position and the other at the other side of the eye glass frame to return the optical elements to their lowered position in the line of vision of the wearer.

Another object of the invention is to provide the optical elements with laterally extending lever arms pivotally mounted on a pivot extending outwardly from the mid portion of the bridge portion of the eye glass frame so that the optical elements may swing in a substantially upright position about said single pivot axis.

Another object of the invention is to slope the pivot support slightly so that the optical elements may swing in a plane which diverges outwardly above the eye glass frame so that the optical elements will slope away from the forehead of the wearer.

Another object of the invention is to provide the lever arms upon which the optical elements are mounted with properly angularly related arms beyond the pivotal support for articulation with the longitudinal operating member for swinging the optical elements up and down with respect to the eye glass frame.

Still further objects, details and advantages of this invention will appear in the specification and claims which follow in conjunction with the accompanying drawings wherein preferred practical embodiments of the invention are illustrated. In these drawings in which like characters of reference designate corresponding parts throughout the views;

Fig. 1 is an exploded perspective view illustrating a pair of optical elements and operating members therefor in accordance with this invention for application to eyeglass frames.

Figs. 2 and 3 are respectively front and rear elevations of the optical elements mounted in an eye glass frame in their normal lowered positions, the bows being omitted.

Fig. 4 is a corresponding plan view thereof.

Fig. 5 is an elevation similar to Fig. 2 with the optical elements in their raised positions.

Fig. 6 is a fragmentary sectional view on line 6—6 of Fig. 2 on an enlarged scale, parts being shown in plan.

Figs. 7 and 8 are enlarged diagrammatic elevations of some of the operating parts shown in Fig. 6 with said parts in positions for the optical elements in their lowered and raised positions respectively.

Fig. 9 is a fragmentary elevation with parts in section view of a slightly modified construction.

Referring to the drawings, in general a satisfactory design of eye glass frame is illustrated wherein side bows 10 are hinged in the usual manner to lens frames 11 and bridge construction 12; these parts as shown may be of plastic material.

This frame structure is formed as best shown in Fig. 1 with a rectangular recess 13 in the rear side of the bridge 12 having a forwardly extending bore 14 providing a journal for concentric bearing pieces 15 and 16. The lens frame 11 and bridge 12 comprising a frontal member has aligned bores 17 extending laterally from this recess 13 through which an operating rod 18 reciprocably passes and has end operating knobs or finger engaging pieces 19 beyond the sides of the frame structure in the manner shown in Figs. 2 to 5 inclusive. A cover 20, also of plastic material or other material corresponding to the material of the eye glass frame structure, is provided to fit in and cover operating parts, as will be described, in the manner shown best in Figs. 1 and 4.

In the preferred form, there are two optical elements 21 and 22, lenses, for reading or optical repair work and the like, or colored sun shields, and the like, for the right and left eyes of the wearer respectively; or in some applications a single optical element for either eye may be employed. Such optical elements may be employed with the frames 11 alone or in conjunction with lenses or other optical elements, not shown, but mounted in the usual manner in the frame members 11 in which they are adapted to fit.

As shown these optical elements 21 and 22 are mounted in corresponding frames 23 and 24 having lever arms 25 and 26, provided with apertures 27 and 28 which are of sizes to have a tight mounting fit on concentric bearing pieces 16 and 15 respectively. Thus these frame arms are mounted in overlapping relationship and the optical elements are in parallel planes so close to each other that for practical purposes they are in the same plane with each other, as is desirable, the offset relation being only slight but subject to correction by offsetting the arms as is readily understood and needs no illustration for obvious reasons.

Lever arms 29 and 30 corresponding with lever arms 25 and 26 are securely mounted on the inner ends of the concentric bearing pieces 16 and 15 respectively and the outer ends of these lever arms 29 and 30 are provided with pins 31 and 32 respectively which engage in a vertical slot 33 provided by an operating element 34 secured so as to depend from and move with operating rod 18. It will thus be seen that when the optical elements are in their lowered position their frame arms 25 and 26 and the operating parts are as diagrammatically shown in Fig. 7 and when they are in raised position the parts are as shown in Fig. 8, although the angles of the corresponding lever arms are not precise in these diagrammatic showings illustrating the principles of their operation. In Fig. 8, showing the relation of the parts in raised positions of the optical elements in solid lines, broken line arrows are shown representing the movement of the lever arm pins 31 and 32 in returning the optical elements to their lowered position, with the operating parts in the positions shown in Fig. 7.

In operation of the optical elements from lowered to raised position or reverse, it will be seen that a mere touch of the finger engaging piece 19 which is extended beyond a side of the eye glass frames will change the position of the optical pieces simultaneously with a quick action projecting the finger engaging piece 19 at the other end of the operating rod 18 beyond the other side of the eye glass frame for a subsequent finger engagement to perform a reverse movement of the optical elements.

In some cases it is desirable that when the optical element or elements are swung to their raised position that they should diverge from the wearer's forehead. Accordingly as illustrated in the fragmentary view, Fig. 9, the frames are provided with a bridge 12a in which the same or similar operating mechanism is provided which will support the optical pieces 21a in such a tilted position of 10° or possibly 15°, inwardly when in the lowered position represented in broken lines, and outwardly in raised position as represented in full lines.

Having described in detail a highly satisfactory preferred form of my invention obviously numerous changes in form and additions in combination arrangements may be made within the spirit of my invention as defined in the following claims.

I claim:

1. In an eye glass frame, a bridge element adapted to ride on the wearer's nose, a frontal member associated with said bridge element and adapted to extend across the wearer's face above his eyes, a pivot member at the mid-portion of said bridge element, at least one movable optical element adapted to be positioned in front of one of the wearer's eyes and being operatively connected to said pivot member, means in said bridge element to rotate said pivot member for swinging said optical member from said position in front of the wearer's eye to a raised position above said frontal member and vice versa, said means including a longitudinally reciprocable rod extending from said bridge element to a point beyond one of the sides of said frontal member, where said rod is accessible for manual operation, said means further including interacting operating means on said pivot member and said rod for translating the longitudinal displacements of said rod caused by manual operation thereof into corresponding rotary movements of said pivot member swinging said optical element from one of said positions to the other under control of said rod.

2. In an eye glass frame, a bridge element adapted to ride on the wearer's nose, a frontal member associated with said bridge element and adapted to extend across the wearer's face above his eyes, at least one frame of a lens for one of the wearer's eyes secured to said frontal member so that said lens is in front of said wearer's eye, a pivot member at the mid-portion of said bridge element, at least one movable optical element adapted to be positioned in front of one of the wearer's eyes and being operatively connected to said pivot member, means in said bridge element to rotate said pivot member for swinging said optical member from said position in front of the wearer's eye to a raised position above said frontal member and vice versa, said means including a longitudinally reciprocable rod extending from said bridge element to a point beyond one of the sides of said frontal member, where said rod is accessible for manual operation, said means further including interacting operating means on said pivot member and said rod for translating the longitudinal displacements of said rod caused by manual operation thereof into corresponding rotary movements of said pivot member swinging said optical element from one of said positions to the other under control of said rod.

3. In an eye glass frame according to claim 2, wherein said pivot member slopes outwardly and downwardly at such angle that in the raised position of said optical element the latter slopes outwardly away from the wearer's forehead.

4. An eye glass frame comprising a pair of movable optical elements; a pair of individual lens frames with an intermediate bridge portion including a frontal member adapted to extend across the wearer's face above his eyes; each of said movable optical elements being normally positioned in front of one of said lens frames; an arm connected to and supporting each of said optical elements and extending to the mid-portion of said bridge portion; said bridge portion having a central opening therethrough; a pair of concentric pivot elements, one within the other, extending through said opening which serves as bearing for the outer of said pivot elements; one of said arms being fixedly connected to one of said concentric pivot elements and the other of said arms to the other of said pivot elements; operating means including a lever secured with one of its ends to each of said pivot elements, an actuating rod guided by and extending to a side of said frontal member where it is accessible for manual operation; means to link said actuating rod to the other ends of said levers; said linking means being adapted to translate longitudinal displacements of said actuating rod caused by manual operation thereof into rotation of said pivot elements with the aid of said levers thereby swinging said optical elements from their normal positions in front of said lens frames to raised positions above said lens frames and vice versa depending upon the direction of the manual operation.

5. An eye glass frame according to claim 4, wherein said actuating rod extends across the entire length of said frontal member and slightly beyond either one of the sides thereof in one of its operative positions and slightly beyond the other side thereof in the other operative position, whereby the rod ends when projecting from either of said sides may be pressed to produce longitudinal movements of said rod to effect swinging movements of said optical elements and cause said rod ends to project from the respective opposite sides of said frontal member.

6. An eye glass frame according to claim 4, wherein said linking means include a slotted element secured to said actuating rod substantially at its center, the slot of said element being substantially perpendicular with respect to the axis of said actuating rod, and a pin extending from said other end of each of said levers to engage said slot.

7. An eye glass frame according to claim 4, wherein said frontal member has aligned bores at both sides of said bridge portion, said actuating rod being guided in and extending through said bores, and wherein said bridge portion has a recess providing a casing for housing said levers and linking means.

8. An eye glass frame according to claim 7, wherein the outer opening of said recess in said bridge portion is covered by a lid concealing said levers and linking means.

References Cited in the file of this patent

UNITED STATES PATENTS

| 732,500 | Baker | June 30, 1903 |
| 1,551,978 | Cserep | Sept. 1, 1925 |

FOREIGN PATENTS

| 12,009 | Great Britain | Apr. 26, 1890 |